United States Patent
Herberg et al.

(10) Patent No.: US 9,953,285 B2
(45) Date of Patent: Apr. 24, 2018

(54) RESIDENTIAL AND SMALL AND MEDIUM BUSINESS DEMAND RESPONSE

(71) Applicant: FUJITSU LIMITED, Kawasaki-shi, Kanagawa (JP)

(72) Inventors: Ulrich Herberg, Sunnyvale, CA (US); Jorjeta G. Jetcheva, San Jose, CA (US); Daisuke Mashima, Sunnyvale, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 14/161,402

(22) Filed: Jan. 22, 2014

(65) Prior Publication Data
US 2015/0206084 A1 Jul. 23, 2015

(51) Int. Cl.
*G06Q 10/06* (2012.01)
*G06Q 50/06* (2012.01)

(52) U.S. Cl.
CPC ....... *G06Q 10/06313* (2013.01); *G06Q 50/06* (2013.01)

(58) Field of Classification Search
CPC ............. G06Q 10/06313; G06Q 50/06; G06Q 10/0639; G06Q 10/06315; G06Q 50/10
See application file for complete search history.

(56) References Cited

U.S. PATENT DOCUMENTS 6,868,293 B1 3/2005 Schurr et al.
8,838,283 B2 9/2014 Imahara et al.
(Continued)

FOREIGN PATENT DOCUMENTS

JP 2010-199916 A 9/2012
JP 2012-196016 A 10/2012
(Continued)

OTHER PUBLICATIONS

"Smart House Strategy Empowered by ECHONET Lite, Device Oriented Approach," Masao Isshiki and Masaki Umejima, Japan Smart Community Alliance, Jul. 2013, available at <https://www.w3.org/2013/07/mmi/slides/Umejima.pdf>, accessed Dec. 22, 2016.*

(Continued)

*Primary Examiner* — Richard N Scheunemann
*Assistant Examiner* — Tyler W Knox
(74) *Attorney, Agent, or Firm* — Maschoff Brennan

(57) ABSTRACT

A method of residential or small and medium business (SMB) demand response (DR) coordination may include receiving a DR event notification from a DR server. The DR event notification may include DR event information pertaining to a DR event and curtailment information. The method may also include communicating a notification acknowledgement to the DR server. The notification acknowledgement may indicate reception of the DR event notification. The method may include displaying a curtailment request pertaining to the DR event. The curtailment request may be based on the curtailment information included in the DR event notification and may include some portion of the DR event information. The method may also include receiving a user input including a DR event participation confirmation or a DR event participation refusal. The method may further include communicating a participation signal representative of at least a portion of the user input to the DR server.

14 Claims, 6 Drawing Sheets

(56) References Cited

U.S. PATENT DOCUMENTS

| | | | |
|---|---|---|---|
| 2004/0043775 A1 | 3/2004 | Kennedy et al. | |
| 2008/0272934 A1* | 11/2008 | Wang | H02J 3/14 340/870.11 |
| 2009/0063228 A1* | 3/2009 | Forbes, Jr. | G01D 4/004 705/7.25 |
| 2009/0326726 A1* | 12/2009 | Ippolito | H02J 3/14 700/291 |
| 2010/0076835 A1* | 3/2010 | Silverman | G06Q 10/06 705/14.33 |
| 2010/0179704 A1* | 7/2010 | Ozog | G06Q 10/06315 700/291 |
| 2010/0228601 A1 | 9/2010 | Vaswani et al. | |
| 2011/0015802 A1* | 1/2011 | Imes | G05D 23/1923 700/300 |
| 2011/0046792 A1* | 2/2011 | Imes | H04L 67/42 700/278 |
| 2011/0090042 A1* | 4/2011 | Leonard | G05B 15/02 340/5.1 |
| 2011/0125542 A1* | 5/2011 | Koch | G06F 17/30976 705/7.16 |
| 2011/0153102 A1* | 6/2011 | Tyagi | G06Q 10/04 700/291 |
| 2011/0172841 A1* | 7/2011 | Forbes, Jr. | G01D 4/004 700/292 |
| 2011/0202185 A1* | 8/2011 | Imes | F24F 11/006 700/277 |
| 2011/0204720 A1* | 8/2011 | Ruiz | B60L 11/1816 307/66 |
| 2011/0231028 A1* | 9/2011 | Ozog | G06Q 10/06 700/291 |
| 2011/0258018 A1* | 10/2011 | Tyagi | G06Q 30/02 705/7.33 |
| 2011/0276288 A1 | 11/2011 | Hsieh et al. | |
| 2012/0065805 A1* | 3/2012 | Montalvo | G06Q 10/06 700/297 |
| 2012/0197457 A1* | 8/2012 | Walter | G06Q 50/06 700/297 |
| 2012/0221162 A1* | 8/2012 | Forbes, Jr. | G01D 4/004 700/295 |
| 2012/0323393 A1* | 12/2012 | Imhof | G05B 15/02 700/297 |
| 2013/0134780 A1* | 5/2013 | Parsonnet | H02J 3/005 307/25 |
| 2013/0289785 A1 | 10/2013 | Takahashi et al. | |
| 2014/0039965 A1* | 2/2014 | Steven | G06Q 10/06315 705/7.25 |
| 2014/0172503 A1* | 6/2014 | Hammerstrom | G06Q 30/0206 705/7.31 |
| 2014/0180440 A1* | 6/2014 | Behrangrad | G06Q 50/06 700/20 |
| 2014/0277795 A1* | 9/2014 | Matsuoka | G06Q 30/0202 700/291 |
| 2014/0330695 A1* | 11/2014 | Steven | G06Q 30/0283 705/37 |

FOREIGN PATENT DOCUMENTS

| | | |
|---|---|---|
| JP | 2013-31355 A | 2/2013 |
| JP | 2013-143898 A | 7/2013 |
| TW | 200825963 A | 6/2008 |
| TW | 201340026 A | 10/2013 |
| WO | 2010/042200 A1 | 4/2010 |

OTHER PUBLICATIONS

Non-Patent Literature, list of search results discovered and considered.*
Greentechmedia.com, Smartphones Are the Best Friend of Residential Demand Response, Oct. 17, 2013 http://www.greentechmedia.com/articles/read/smart-phones-are-best-friend-of-residential-demand-response.
International Search Report dated Mar. 26, 2015 as received in Application No. PCT/US2014/72565.
Taiwan Office Action for corresponding application No. 104112892, dated Aug. 17, 2016 (partial translation).
Japanese Office Action for corresponding application No. 2016-547158, dated Jun. 20, 2017.
Japanese Office Action dated Oct. 6, 2017 in application No. 2016-547158.

* cited by examiner

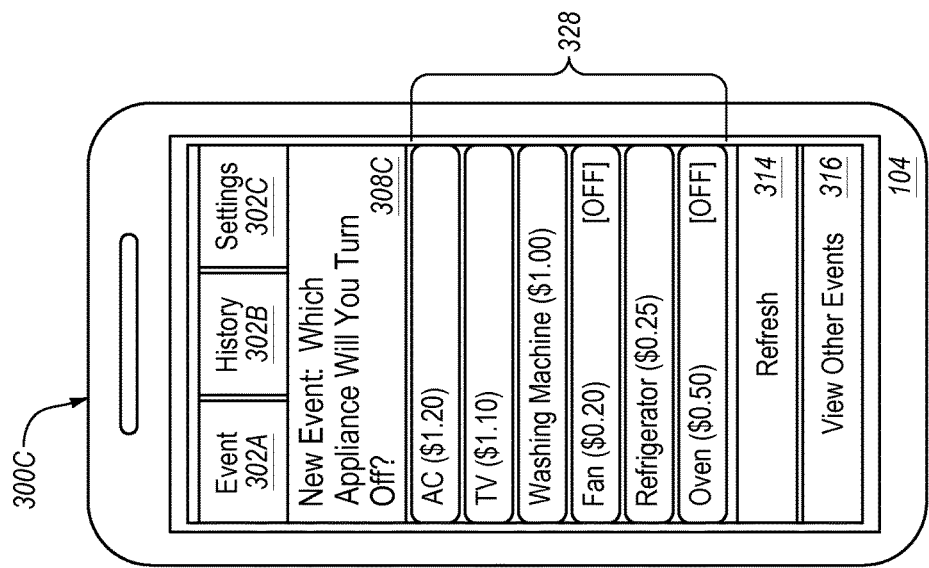
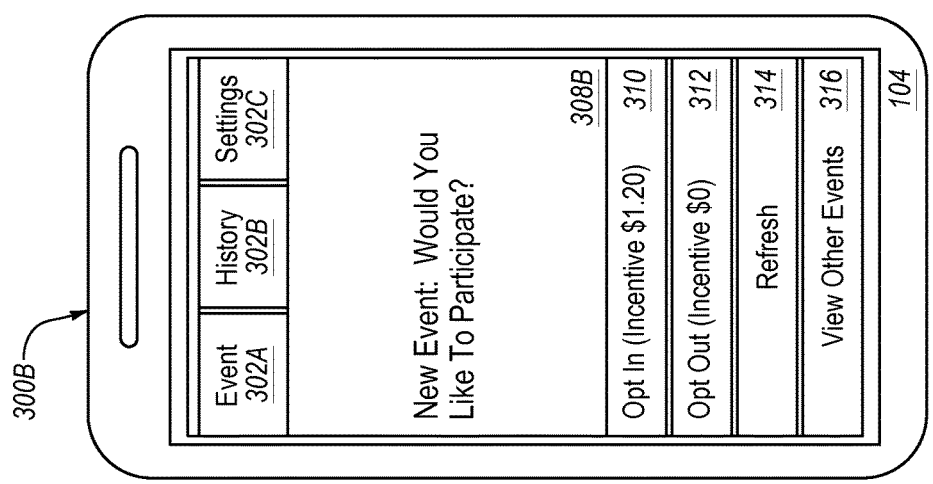
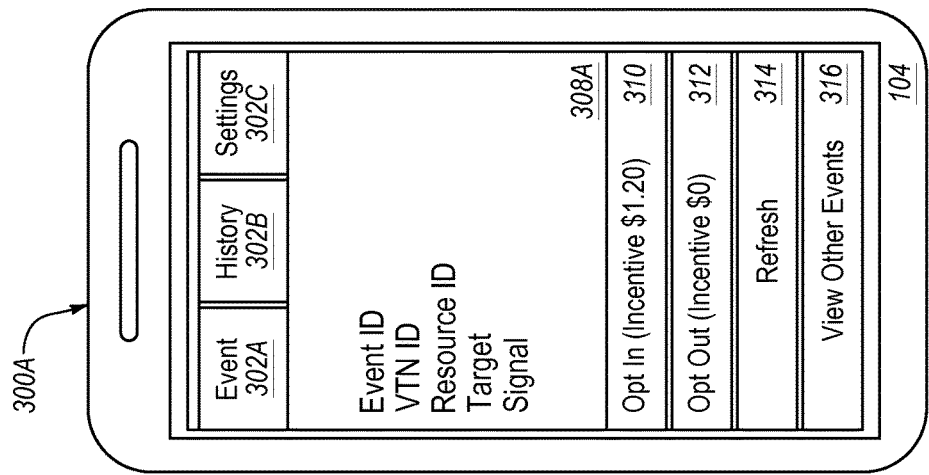

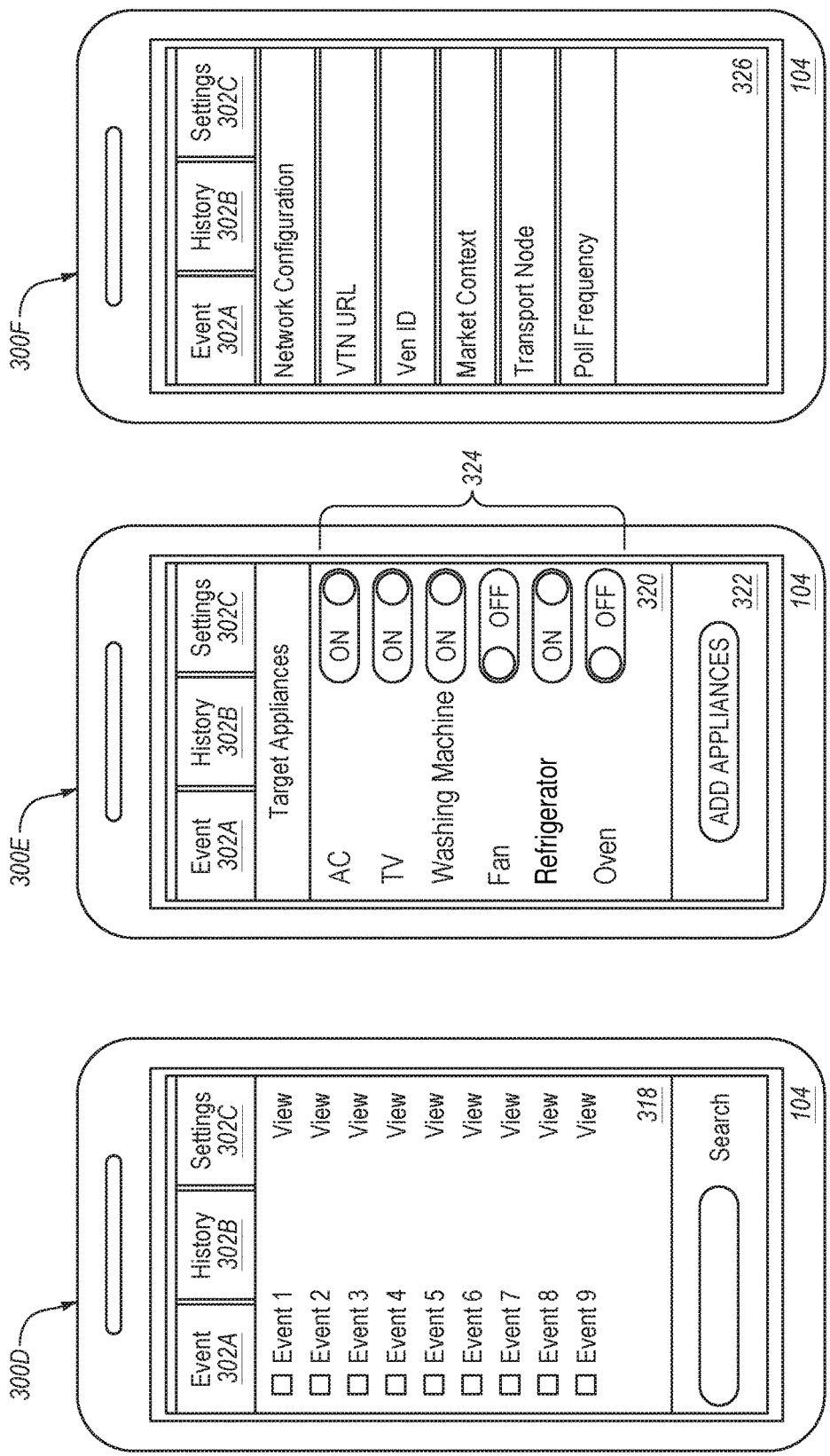

RESIDENTIAL AND SMALL AND MEDIUM BUSINESS DEMAND RESPONSE

FIELD

The embodiments discussed herein are related to residential and small and medium business demand response.

BACKGROUND

Utilities incentivize curtailment of energy usage during certain high load periods to increase the ability of the utilities to meet a larger demand or to minimize production costs. For example, in summer months, peak energy usage may occur on hot days in the late afternoon. A utility may offer an incentive to a factory to reduce energy usage during the late afternoon. In response, the factory may delay a high load production run until later in the evening, turn down the air-conditioning in the factory, or otherwise reduce energy use. In this manner, the utility may increase its ability to meet energy demands during the peak energy usage and/or avoid producing or purchasing additional energy to meet the energy demands.

The curtailment in energy usage during peak or high load periods may be referred to generally as demand response (DR). The energy usage curtailment during a specified time period may be referred to as a DR event. DR events generally occur when a utility expects a high demand and asks customers to reduce or curtail energy usage. When a customer reduces its energy usage by an agreed-upon amount, the utility may provide an incentive to the customer.

In some DR systems, DR aggregators mediate communication between utilities and customers. The DR aggregators generally have an agreement with the utilities to coordinate with the customers and implement DR events.

Inclusion of residential customers and/or small and medium business (SMB) customers (collectively, residential/SMB customers) in DR events may pose some difficulty. For example, the energy curtailment of each residential/SMB customer is relatively limited. Accordingly, the utility or the DR aggregator may limit resources invested in coordinating participation of the residential/SMB customers. Additionally, the residential/SMB customers may have a varying schedule and limited sophistication, which may decrease a likelihood that the residential/SMB customers may participate in a DR event.

Some utilities or DR aggregators communicate with residential/SMB customers via short message service (SMS) messages or via e-mail messages. However, communication via SMS messages and e-mail messages may be ineffective at motivating residential/SMB customers to participate in DR events and an inefficient use of resources. For example, SMS may be expensive for the utility or DR aggregator and may be communicated through a stand-alone system. Additionally, SMS messages may not include sufficient information to motivate residential/SMB customers to participate in a DR event.

Alternatively, some appliances enable control, directly or indirectly, by the utility or the DR aggregator. However, the appliances are expensive to purchase and complex to set up. Thus, the incentives provided for participation in DR events may not justify expenses associated with implementing the appliances.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of residential or small and medium business (SMB) demand response (DR) coordination may include receiving a DR event notification from a DR server. The DR event notification may include DR event information pertaining to a DR event and curtailment information. The method may also include communicating a notification acknowledgement to the DR server. The notification acknowledgement may indicate reception of the DR event notification. The method may include displaying a curtailment request pertaining to the DR event. The curtailment request may be based on the curtailment information included in the DR event notification and may include some portion of the DR event information. The method may also include receiving a user input including a DR event participation confirmation or a DR event participation refusal. The method may further include communicating a participation signal representative of at least a portion of the user input to the DR server.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A-3F illustrate example screenshots of information that may be displayed on an example device that may be implemented in the DR system of FIG. 1;

DESCRIPTION OF EMBODIMENTS

Some embodiments described herein relate to demand response (DR) for residential customers and/or small to medium business (SMB) customers (collectively, residential/SMB customers). In an example embodiment, a DR module may be stored on a device that is associated with a residential/SMB customer. The DR module may be configured to receive DR event notifications from a DR server that is associated with a utility or a DR aggregator. After the device receives the DR event notification, the DR module may communicate a notification acknowledgement to the DR server. The device may also display a curtailment request to the residential/SMB customer. The residential/SMB customer may then opt in or opt out of the DR event based upon information and incentives included in the curtailment request by providing some user input to the device. Additionally or alternatively, the residential/SMB customer may be automatically opted in based upon predefined pattern or an agreement, for instance. In response, the device may then communicate a participation signal to the DR server indicating whether the residential/SMB customer will participate in the DR event.

Additionally or alternatively, the DR module may enable selection of one or more target appliances. In these and other embodiments, resource curtailment during a DR event may be based upon changes to operation of the target appliances. The curtailment request may then include information and incentives related to the target appliances. Additionally, the residential/SMB customer may then opt in or opt out of curtailment of one or more of the target appliances by providing some user input to the device. Another participation signal sent to the DR server may include or indicate which of the target appliances the residential/SMB customer has agreed to operate in accordance with the curtailment request.

Based on the participation signals and the notification acknowledgement, the utility or the DR aggregator may estimate a resource curtailment of a DR event. Additionally, the utility or the DR aggregator may develop historical data related to the residential/SMB customer, for example, incentive amounts sufficient to prompt participation, successful compliance with agreed-to curtailment, time delay before a response, and the like. The historical data may be used in planning future DR events and/or selection of or inclusion of certain residential/SMB customers in future DR events, for example.

Figure 1:
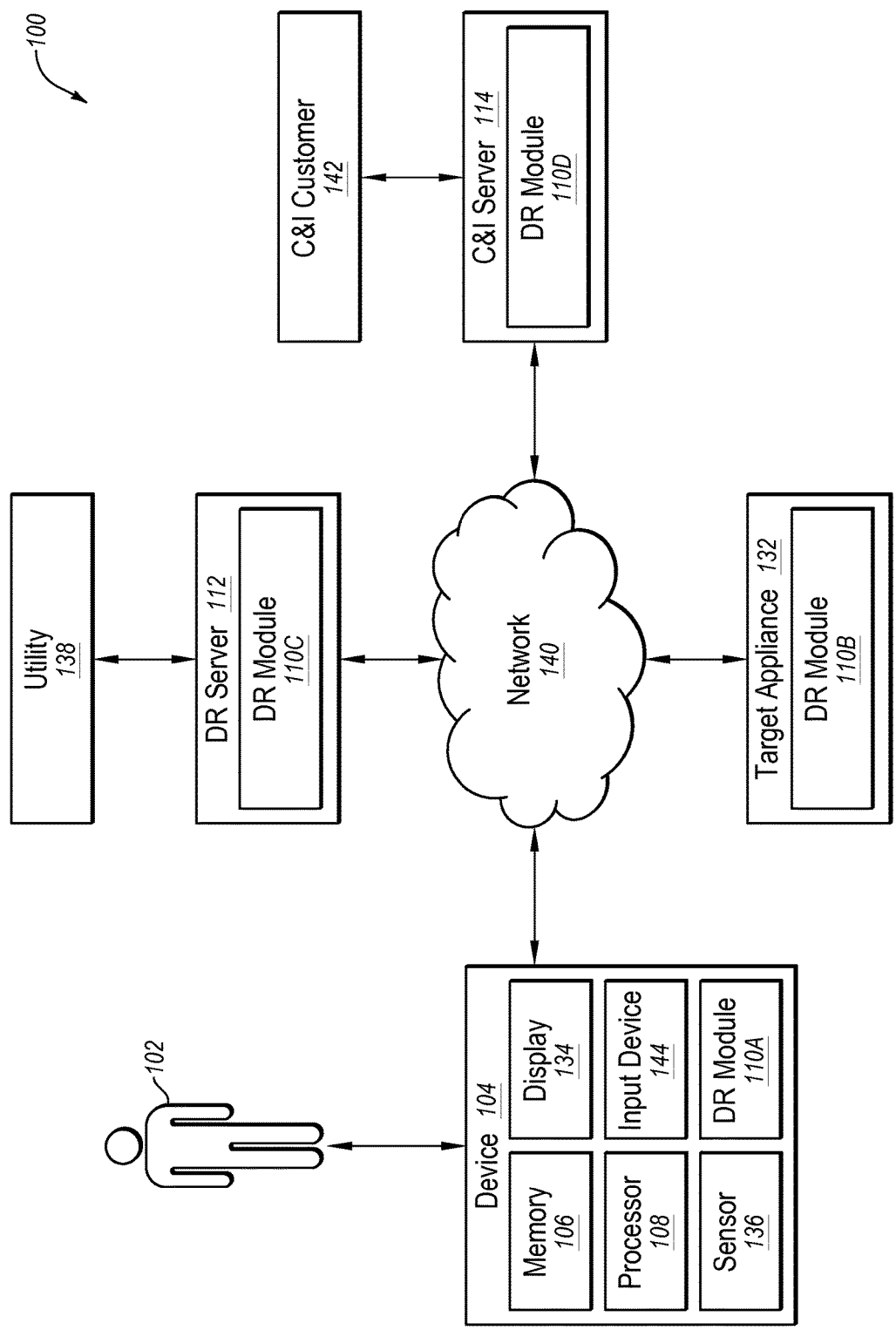
FIG. 1 illustrates an example demand response (DR) system.

FIG. 1 illustrates an example DR system 100. The DR system 100 may be configured for communication of information pertaining to DR events between a DR server 112 and a device 104. Specifically, in some embodiments, the DR system 100 may be configured to communicate the information to a residential/SMB customer 102 via the device 104. The information may be communicated to the residential/SMB customer 102 to notify the residential/SMB customer 102 of a DR event and/or to solicit participation in the DR event by the residential/SMB customer 102, for instance. Additionally, the DR system 100 may be configured to enable communication of information from the residential/SMB customer 102 to a utility 138 via the device 104 and the DR server 112. The information communicated from the residential/SMB customer 102 to the utility 138 may include a notification acknowledgment, feedback, and user input, for example. In some embodiments, the user input may include a DR event participation confirmation or refusal. The DR system 100 may at least partially enable implementation of the DR event and/or energy curtailment associated with the DR event using the device 104 relative to a target appliance 132. For example, in some embodiments, an operation of the target appliance 132 may be controlled through commands communicated from the DR server 112 and/or from the device 104.

As depicted in FIG. 1, the DR system 100 may include the device 104, the target appliance 132, the DR server 112, and a commercial and industrial (C&I) server 114. In the DR system 100, the device 104, the target appliance 132, the DR server 112, and the C&I server 114 may communicate via a network 140. Additionally, in the DR system 100, DR modules 110A-110D (generally, DR module 110 or DR modules 110) may be included in one or more of the device 104, the target appliance 132, the DR server 112, and the C&I server 114. The DR module 110 may be configured to enable communication of information pertaining to DR events between the device 104, the target appliance 132, the DR server 112, and the C&I server 114 via the network 140. Through use of the DR modules 110, the utility 138, the residential/SMB customer 102, a C&I customer 142, or any combination thereof may be coordinated in relation to DR events. Each of the network 140, the device 104, the target appliance 132, the DR server 112, and the C&I server 114 are described below with relationship to the DR module 110.

The DR system 100 is described herein with particularity in which the utility 138 provides a resource such as electricity to a residential site or an SMB site (not shown) that is associated with the residential/SMB customer 102. Additionally, in the DR system 100, the utility 138 may provide the resource to a C&I site (not shown) associated with the C&I customer 142. The DR modules 110 may provide a platform in which information pertaining to DR events may be communicated to the device 104 and the C&I server 114. The residential/SMB customer 102 and/or the C&I customer 142 may then participate in the DR event, which may include curtailing resource use of the residential site, the SMB site, and/or the C&I site. In the DR system 100, the DR modules 110 may accordingly enable coordination of the C&I customer 142 and the residential/SMB customer 102 via a single platform. While described in the context of a utility that provides electricity, other embodiments may be implemented in the context of a utility that provides another resource, such as water, natural gas, or another resource.

The utility 138 may include any entity involved in production, transmission, and/or distribution of the resource. The utility 138 may be publicly owned or privately owned. Some examples of the utility 138 may include, but are not limited to, a power plant, an energy cooperative, and an independent system operator (ISO). Additionally, in some non-illustrated embodiments, the utility 138 may be substituted for or included with a DR aggregator. The DR aggregator may act as an intermediary between the utility 138 and the residential/SMB customer 102 and/or the C&I customer 142. The DR aggregator may coordinate implementation of one or more DR events and may accordingly communicate information pertaining to the DR events via the DR modules 110.

The DR server 112 may include a hardware server that includes a processor, memory, and communication capabilities. In the illustrated embodiment, the DR server 112 may be coupled to the network 140 to send and receive information to and from one or more of the device 104, the C&I server 114 and the target appliance 132 via the network 140. The DR server 112 may host or have otherwise stored thereon a DR module 110C. The DR module 110C may be configured to communicate information with one or more of the DR modules 110A, 110B, and 110D and to perform operations based upon the information. Specifically, in some embodiments, the DR module 110C may be configured to communicate a DR event notification to the DR module 110A of the device 104. The DR event notification may include DR event information pertaining to a DR event and curtailment information. The information and/or the curtailment information may include incentives for DR event participation and/or for target appliance (e.g., the target appliance 132) curtailment.

The DR module 110C may also generate the incentives. For example, the DR module 110C may generate incentives based on one or more of economic conditions such as current resource prices, current demand, expected prices, expected demand, and historical data related to the C&I customer 142 and/or the residential/SMB customer 102. The DR event notification as well as other information communicated in the DR system 100 may be configured according to a particular format such as extensible markup language (XML) with defined schema.

Additionally, the DR module 110C of the DR server 112 may be configured to receive a notification acknowledgement, feedback, a participation signal, other data, or a combination thereof from the DR module 110A of the device 104, the DR module 110B of the target appliance 132, the DR module 110D of the C&I server 114, or any combination thereof. The notification acknowledgement may indicate reception of the DR event notification. Accordingly, the utility 138 may thereby have an indication that the DR event notification has at least been received, even if no subsequent communication occurs. The participation signal may be representative of at least a portion of user input received at the DR module 110A of the device 104. The user input may include a DR event participation confirmation, which may indicate that the residential/SMB customer 102 agrees to participate in the DR event or a DR event participation refusal, which may indicate the residential/SMB customer 102 does not agree to participate in the DR event. In some embodiments, a lack of a DR event participation confirmation may indicate a refusal or a lack of a DR event refusal may indicate a confirmation. The feedback may be based on data gathered by a sensor 136 included in the device 104. Based on the feedback, the DR module 110C may assess a participation of the residential/SMB customer 102. Additionally, based at least partially on the participation signal, the notification acknowledgement, and/or the feedback, the DR module 110C may estimate resource curtailment for the DR event. For example, the DR module 110C may know whether the residential/SMB customer 102 has agreed to participate, an amount of the resource the residential/SMB customer 102 has agreed to curtail, and the likelihood of compliance with the agreed-to curtailment. In embodiments of the DR system 100 including multiple residential/SMB customers 102 and multiple C&I customers 142, the DR module 110C may combine or aggregate the participation signal, the notification acknowledgement, and/or the feedback from the multiple residential/SMB customers 102 and multiple C&I customers 142 to estimate resource curtailment for the DR event.

In some embodiments, the DR module 110C may be configured to communicate a second DR event notification to the C&I customer 142. The second DR event notification may include the DR event information pertaining to the DR event and curtailment information relevant to the C&I customer 142. Specifically, in these and other embodiments, the DR module 110C may communicate the DR event notification to the DR module 110D included in the C&I server 114.

In the DR system 100 of FIG. 1, the DR module 110C may be configured to communicate the DR event notification to the DR module 110A of the device 104 and the second DR event notification to the C&I customer 142. In some embodiments, the DR system 100 may include multiple residential/SMB customers 102 and multiple C&I customers. In these and other embodiments, the DR module 110C may accordingly communicate more than two DR event notifications to the multiple residential/SMB customers and/or multiple C&I customers. Any subset of the DR event notifications may include different information pertaining to the DR event, different curtailment amounts, incentive information, etc. without limitation. Additionally, over time, the DR event notifications may vary. The variation in the DR event notifications may occur during a single DR event and with respect to a single residential/SMB customers 102 or a single C&I customer 142. Additionally or alternatively, the DR event notifications may be similar or identical over multiple DR events.

The C&I server 114 may include a hardware server that includes a processor, memory, and communication capabilities. In the illustrated embodiment, the C&I server 114 may be coupled to the network 140 to send and receive data to and from one or more of the device 104, the DR server 112, and the target appliance 132 via the network 140. The C&I server 114 may host or have otherwise stored thereon the DR module 110D. The C&I server 114 may be located at a C&I site associated with the C&I customer 142. The utility 138 may communicate with the C&I customer 142 via the C&I server 114 to assess participation of the C&I customer 142 in DR events.

The network 140 may be wired or wireless, and may have numerous different configurations including, but not limited to, a star configuration, token ring configuration, or other configurations. Furthermore, the network 140 may include a local area network (LAN), a wide area network (WAN) (e.g., the Internet), and/or other interconnected data paths across which multiple devices may communicate. In some embodiments, the network 140 may be a peer-to-peer network. The network 140 may also be coupled to or include portions of a telecommunications network that may enable communication of data in a variety of different communication protocols and via a variety of different media.

In some embodiments, the network 140 includes BLUETOOTH® communication networks and/or cellular communications networks for sending and receiving data including via SMS, multimedia messaging service (MMS), hypertext transfer protocol (HTTP), direct data connection, wireless application protocol (WAP), e-mail, smart energy profile (SEP), Echonet Lite, OpenADR, etc.

In some embodiments, the network 140 may enable communication of control commands to the target appliance 132. The control commands may be formatted according to a standard-based protocol or media such as SEP, Echonet Lite, OpenADR, or another suitable protocol or media (e.g., wireless fidelity (Wi-Fi), ZIGBEE®, HOMEPLUG® Green, etc.). Additionally, the network 140 may include or interface with satellite-based locational systems (e.g., global positioning systems (GPS)) and/or terrestrial locational systems (e.g., Wi-Fi-based positioning system (WPS)) that may provide locations of the device 104, for instance.

Communication may occur in the network 140 via multiple media and/or multiple protocols. For example, in some embodiments, communication between the DR module 110C and the DR modules 110A and 110D via the network 140 may be formatted according to the OpenADR. Additionally in these and other embodiments, communication between the DR module 110A and the DR module 110B may be formatted according to SEP.

The target appliance 132 may include any appliance or device that receives and/or consumes a resource from the utility 138 and has a curtailment capability. For example, the target appliance 132 may have a capability to operate in a reduced consumption state, to be turned off, and the like. The target appliance 132 may be under the control of the residential/SMB customer 102 such that the residential/SMB customer 102 may affect, directly or indirectly, operation of the target appliance 132. Some examples of the target appliance 132 may include, but is not limited to, a thermostat, lighting, a microwave, a pump, a motor, a clothes washing machine, a dishwasher, a heater, an air-conditioner, a clothes dryer, a fan, a refrigerator, and an oven.

The target appliance 132 may include hardware that includes a processor, memory, and communication capabilities. In the illustrated embodiment, the target appliance 132 may be coupled to the network 140 to send and receive data to and from one or more of the device 104, the DR server 112, and the C&I server 114 via the network 140. The target appliance 132 may include the DR module 110B. The DR module 110B may receive and implement signals such as control commands that may affect the operation of the target appliance 132. The control commands may be communicated from the DR server 112 and/or the device 104 in some embodiments. Additionally, in some embodiments, the target appliance 132 may communicate feedback, the participation signal, and/or the notification acknowledgment.

The residential/SMB customer 102 may be associated with the device 104. For example, the device 104 may be owned and/or routinely operated by the residential/SMB 102. Additionally, the residential/SMB customer 102 may be further associated with a residential site or the SMB site (mentioned above) such as a building, a house, a structure, a piece of equipment (e.g., the target appliance 132), or another object that consumes the resource distributed by the utility 138. Accordingly, the residential/SMB customer 102 may at least partially control consumption of the resource of the residential site or the SMB site, which may include control of the target appliance 132.

The device 104 may be a computing device that includes a processor 108, memory 106, and network communication capabilities. The network communication capabilities may include Internet (e.g., Wi-Fi) networking capabilities, BLUETOOTH®, 3 G, 4 G, LTE communication networking capabilities, or any combination thereof suitable for communication via the network 140 with one or more of the DR server 112, the target appliance 132, and the C&I server 114. Some examples of the device 104 may include a laptop computer, a desktop computer, a tablet computer, a mobile telephone, a personal digital assistant (PDA), a mobile e-mail device, a portable game player, a portable music player, a television with one or more processors embedded therein or coupled thereto or other electronic device capable of accessing and communicating via the network 140.

The device 104 may include the DR module 110A. The DR module 110A installed on the device 104 may be configured to enable interaction with the residential/SMB customer 102. Additionally, the DR module 110A may be configured to interface with the DR modules 110B-110D via the network 140. Specifically, in some embodiments, the DR module 110A may be configured to interface with the DR module 110C of the DR server 112 and the DR module 110B of the target appliance 132. For example, in these and other embodiments, the DR module 110A may be configured to receive a DR event notification from the DR module 110C of the DR server 112. In response, the DR module 110A may communicate the notification acknowledgement to the DR module 110C of the DR server 112. The DR module 110A may then display a curtailment request pertaining to the DR event. The curtailment request may be based on the curtailment information included in the DR event notification and/or some portion of the DR event information.

The DR module 110A may then receive user input from the residential/SMB customer 102. The user input may include the DR event participation confirmation or the DR event participation refusal. The DR module 110A may then communicate the participation signal, which may be representative of at least a portion of the user input to the DR module 110C of the DR server 112.

Additionally, the DR module 110A may enable initialization between the device 104 and the target appliance 132 and/or between the residential/SMB customer 102 and the device 104. In some embodiments, the initialization may occur before any DR event notifications are communicated to the device 104. Additionally or alternatively, the residential/SMB customer 102 may initialize the target appliance 132 after one or more DR event notifications are communicated to the device 104. In some embodiments, the DR system 100 includes multiple target appliances. In these embodiments, one or more target appliances may be initialized before any of the DR event notifications are communicated to the device 104 and one or more other target appliances may be initialized after one or more of the DR event notifications are communicated to the device 104.

For example, the DR module 110A may generate an appliance list including appliances having resource curtailment capabilities. The appliance list may include the target appliance 132. The DR module 110A may display the appliance list to the residential/SMB customer 102 on a display 134. The DR module 110A may then receive a selection of the target appliance 132 by the residential/SMB customer 102. Selection of the target appliance 132 may indicate the association between the residential/SMB customer 102 and the target appliance 132 and/or a willingness by the residential/SMB customer 102 to operate the target appliance 132 in accordance with curtailment requests.

In these and other embodiments, the curtailment request may include resource curtailment pertaining to the target appliance 132. In addition, the user input may include a target appliance selection indicating curtailment during the DR event of a selected target appliance 132. Additionally, the curtailment request may include an incentive pertaining to curtailment of the target appliance 132 during the DR event.

The DR module 110A may also determine a control command for the target appliance 132. The control command may be configured to affect an operation of the target appliance 132 in accordance with the DR event. The control command may be based on the DR event notification and/or a pre-configured setting related to the target appliance 132. The control command may then be communicated to the target appliance 132 in response to the user input including the DR event participation confirmation.

In some embodiments, the device 104 may include the display 134. The display 134 may include a light-emitting diode (LED) display, an organic LED (OLED), a touch screen (e.g., resistive, surface acoustic wave, capacitance, infrared grid, etc.), or any other suitable display device. The display 134 may be communicatively coupled to the processor 108 and/or the memory 106. Images and data stored in the memory 106 may be displayed on the display 134. Additionally, the processor 108 may control the display of images and data on the display 134. For example, the DR module 110A may communicate a curtailment request to the display 134. The curtailment request may accordingly be displayed to the residential/SMB customer 102.

Additionally or alternatively, the device 104 may include an input device 144. The input device 144 may include any system or device configured to receive the user input. The user input may then be communicated to the processor 108, the memory 106, the DR module 110A, and the like. The input device 144 may include, but is not limited to, a button, a mouse, a keyboard, a remote control, and a microphone. Additionally or alternatively, in some embodiments, the display 134 may be configured to receive user input. For example, in embodiments in which the display 134 includes a touch screen, the residential/SMB customer 102 may provide user input to the device 104 via the display 134.

Additionally, the device 104 may include the sensor 136. The sensor 136 may be used to measure a condition of the device 104 such as an environmental condition (e.g., temperature) of the device 104, a location of the device 104, and an orientation of the device 104. The sensor 136 may be communicatively coupled to the processor 108 and/or the memory 106. The processor 108 may receive a signal indicating the condition measured by the sensor 136 and perform an action based thereon (e.g., communicate the signal to the display 134 or to the DR server 112). Additionally, the memory 106 may receive a signal indicating the condition measured by the sensor 136 and may store the signal or a representation thereof.

An example of the sensor 136 may include a temperature sensor. The temperature sensor may be used to measure a thermal state of an environment of the device 104. The processor 108 or the DR module 110A may receive a measurement of the thermal state and may generate a signal representative of the measurement. The signal representative of the measurement may be sent to the DR server 112 via the network 140, for instance. The thermal state may be an example of the feedback communicated from the device 104 to the DR server 112. For example, a DR event may request that the residential/SMB customer 102 reduce or increase the temperature of the residential site or the SMB site. The thermal state before, during, and/or after the DR event may be communicated to the DR server 112, which may indicate compliance (or not) with the request.

Additionally or alternatively, the sensor 136 may include a gyroscopic sensor. The gyroscopic sensor may measure the orientation of the device 104. An orientation measurement may be communicated as feedback to the DR server 112. For example, the residential/SMB customer 102 may point the device 104 at the target appliance 132, which may indicate the residential/SMB customer 102 intends to affect operation of the target appliance 132. The processor 108 or the DR module 110A may receive a measurement of the orientation and generate a signal representative thereof. The measurement of the orientation may be sent to the DR server 112 via the network 140, where the measurement may be used as the feedback.

For instance, a DR event may include a request to reduce a thermostatic setting of a heater. The residential/SMB customer 102 may then re-orient the device 104 to communicate a control command to a thermostat that controls the heater. The signal may include the control command that reduces the thermostatic setting. In the process of communicating the control command to the thermostat, an orientation sensor may measure a change in orientation of the device 104, which may be communicated to the DR server 112. The measurement of the orientation of the device 104 may be interpreted as compliance with the request.

Additionally or alternatively, the sensor 136 may include a camera. The camera may generate a photo or video of a condition related to the device 104. The processor 108 or the DR module 110A may receive the photo or the video and/or may send the photo or the video to the DR server 112 via the network 140. The photo or the video may be an example of feedback communicated from the device 104 to the DR server 112. For example, a DR event may include a request to reduce the temperature of the residential site or the SMB site. The target appliance 132 may include a thermostat that may be controlled via the device 104. The camera may generate one or more screenshots of the thermostat before, during, and/or after a temperature set point of the thermostat is reduced in accordance with a curtailment request. The screenshot may be communicated to the DR server 112 and interpreted as an indication of compliance with the curtailment request.

Additionally or alternatively, the sensor 136 may include a location sensor. The location sensor may be configured to measure a current location of the device 104. The current location of the device 104 may be communicated to the DR server 112 via the network 140, for instance. The current location may be based at least partially on positioning information received from a receiver. The receiver may be included in the location sensor or may be a separate component that communicates with the location sensor. An example of the receiver may be a GPS receiver, a Wi-Fi positioning receiver, or any other suitable receiver that may generate and/or communicate positioning information.

In some embodiments, the location sensor may be configured to continuously, periodically, randomly, pseudo-randomly, or on-demand measure the current location of the device 104. The current location may be communicated to the DR server 112. Additionally or alternatively, the DR module 110C of the DR server 112 may communicate a signal to the DR module 110A of the device 104 requesting the location sensor to measure the current location of the device 104. The DR module 110A of the device 104 may then communicate the current location to the DR server 112 via the network 140.

Based on the current location, the DR server 112 may determine whether the current location of the device 104 and/or the residential/SMB customer 102 are within a particular area. In response to the current location being within the particular area, the DR server 112 may communicate information, e.g., the DR event notification, pertaining to a DR event to the device 104. In response to the current location not being within the particular area, the DR server 112 may not communicate information pertaining to a DR event to the device 104.

For example, the particular area may include a residence of the residential/SMB customer 102. In some circumstances, the residential/SMB customer 102 may be more likely to participate in a DR event when the residential/SMB customer 102 is at the residence where the residential/SMB customer 102 may easily affect operation of an appliance. Thus, when the residential/SMB customer 102 is within the residence, the DR server 112 may communicate information pertaining to a DR event to the device 104. When the residential/SMB customer 102 is not within the residence, the DR server 112 may not communicate information pertaining to the DR event to the residential/SMB customer 102. By basing a decision on whether to communicate the information pertaining to the DR event on the current location, the utility 138 may reduce instances in which the information is communicated, but the residential/SMB customer 102 is likely not going to participate in a DR event.

Additionally or alternatively, in other circumstances, the residential/SMB customer 102 may be more likely to participate in a DR event when the residential/SMB customer 102 is not at the particular area, depending on an action requested to curtail energy usage. For example, the particular area may include a residence of the residential/SMB customer 102. The action requested may include reducing a temperature set point of a thermostat in the winter. The residential/SMB customer 102 may be more likely to participate in a DR event when the residential/SMB customer 102 is not at the residence. Thus, when the residential/SMB customer 102 is within the residence, the DR server 112 may not communicate information pertaining to a DR event to the device 104. When the residential/SMB customer 102 is within the residence, the DR server 112 may not communicate information pertaining to the DR event to the residential/SMB customer 102.

Additionally or alternatively, the device 104 may communicate with the target appliance 132 via different protocols and/or different media based on the current location. In some embodiments, in response to the current location being within the particular area, the device 104 may communicate a control command to the target appliance 132 via a first protocol and/or a first media (e.g., a command formatted according to SEP communicated via a Wi-Fi media). In response to the current location not being within the particular area, the device 104 may communicate a control command to the target appliance 132 via a second protocol and/or a second media (e.g., Echonet Lite and a cellular media).

For example, the particular area may include a residence of the residential/SMB customer 102. When the residential/SMB customer 102 is within the residence, the device 104 may communicate a control command to the target appliance 132 using a standard-based protocol. When the residential/SMB customer 102 is not within the residence, the device 104 may know an internet protocol (IP) address of a wireless gateway (e.g., a dynamic domain name system (DNS)). The device 104 may then communicate the control command through a firewall (e.g., via network address translation (NAT) or universal plug and play (UPnP)).

Additionally or alternatively, the sensor 136 may include one or more other sensors that may be configured to measure conditions of the device 104, the residential/SMB customer 102, the target appliance 132, or some combination thereof.

Additionally, the DR module 110A may be configured to limit communication between the DR module 110A and the DR server 112. One such limit may be a notification limit. The notification limit may include a condition that is to be met for the communication of a DR event notification to be complete and/or information (e.g., the curtailment request) to be displayed to the residential/SMB customer 102. The notification limit may include, but is not limited to, a maximum number of DR event notifications, a maximum frequency of DR event notifications, a prioritization of DR event notifications, and a device preference. In some embodiments, the DR module 110A may display a notification limit inquiry. The DR module 110A may receive a selection of one or more notification limits. Prior to display of a curtailment request, the DR module 110A may verify the DR event notification has not violated one or more of the notification limits.

Additionally, the DR module 110A may be configured to generate automated control of the target appliance 132. The automated control may be implemented in embodiments in which the target appliance 132 includes a capacity to be controlled through control commands. The automated control may be pre-configured for the target appliance 132 and/or for one or more other appliances in embodiments including multiple appliances.

The automated control may include one or more circumstances during which the customer 102 agrees to enable automated control of the target appliance 132. For example, a circumstance triggering automated control may include an incentive greater than particular monetary amount. When the DR event notification includes an incentive that is greater than the particular amount, a control command may be communicated to the target appliance 132 without input of the customer 102. The circumstances triggering the automated control may be stored in the memory 106. Thus, when a DR event notification is received at the device 104, the DR module 110A may determine whether the circumstances that trigger an automated control decision are present. In response to the circumstances being present, the DR module 110A may transmit a control command without input from the customer 102.

Modifications, additions, or omissions may be made to the DR system 100 without departing from the scope of the present disclosure. For example, while FIG. 1 depicts one device 104 associated with one residential/SMB customer 102, the present disclosure applies to a DR system architecture having one or more devices 104, one or more residential/SMB customers 102, or any combination thereof. Furthermore, while FIG. 1 includes one DR server 112, one C&I server 114, and one target appliance 132, the DR system 100 may include multiple DR servers, multiple C&I servers, multiple appliances, or any combination thereof. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

The DR modules 110 may include code and routines for facilitating DR event coordination between the utility 138 and the residential/SMB customer 102. In some embodiments, the DR modules 110 act in part as a thin-client application that may be stored on the device 104 and in part as components that may be stored on one or more of the DR server 112, the C&I server 114, and the target appliance 132 of the DR system 100. In some embodiments, the DR modules 110 may be implemented using hardware including a field-programmable gate array (FPGA) or an application-specific integrated circuit (ASIC). In some other instances, the DR modules 110 may be implemented using a combination of hardware and software. In some embodiments, the DR modules 110 may be stored in a combination of the device 104, the DR server 112, the C&I server 114, and the target appliance 132 or in one of the devices 104, the DR servers 112, and the C&I servers 114.

In the DR system 100, memory (e.g., the memory 106, memory included in one or more of the servers 112, 114, and the target appliance 132) may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
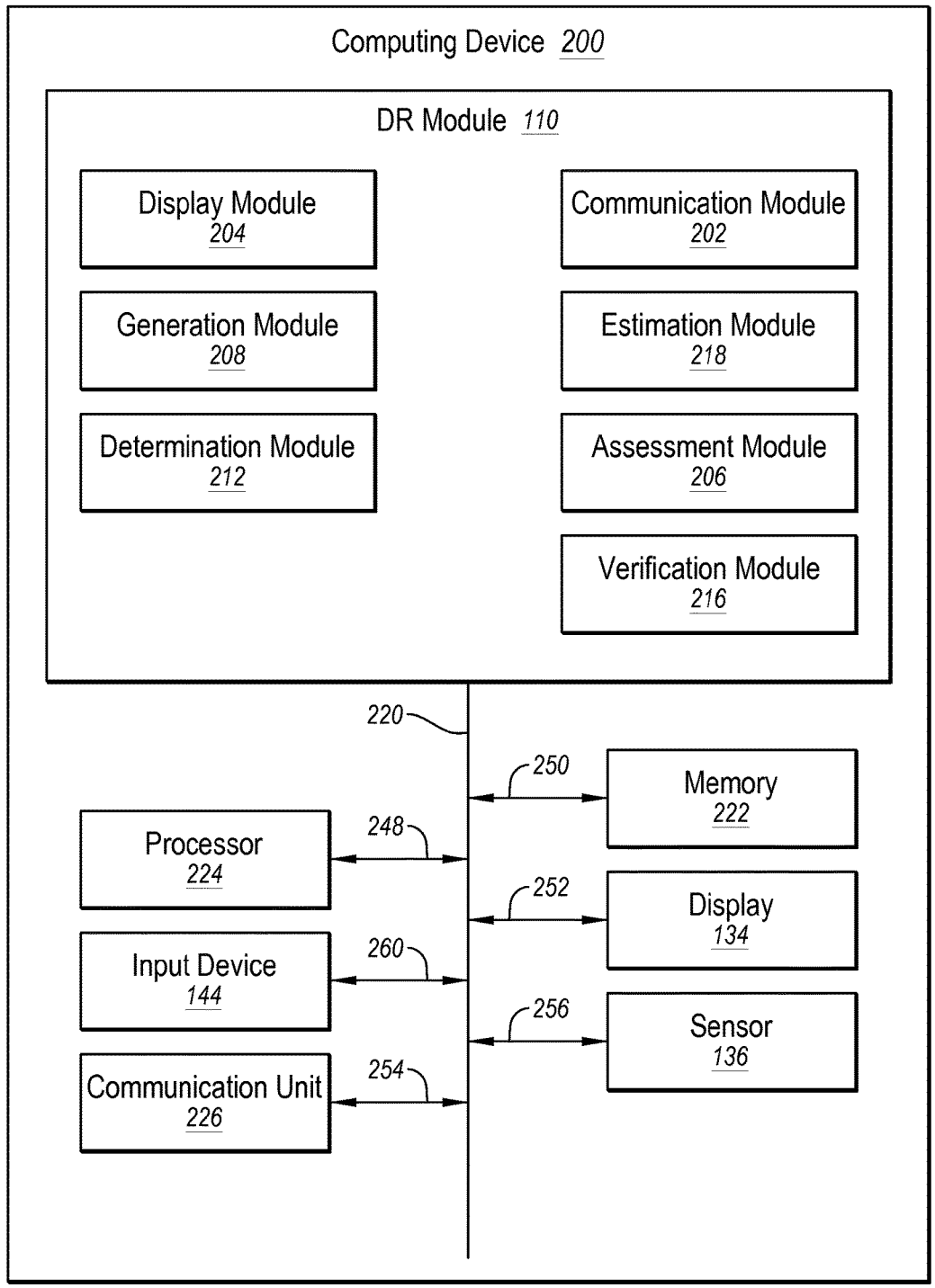
FIG. 2 illustrates an example computing system that may be implemented in the DR system of FIG. 1.

Referring now to FIG. 2, an example of the DR module 110 is shown in more detail. FIG. 2 is a block diagram of a computing device 200 that includes the DR module 110, a processor 224, a memory 222, and a communication unit 226. The components of the computing device 200 may be communicatively coupled by a bus 220. In some embodiments, the computing device 200 may include one or more of the device 104, the DR server 112, the C&I server 114, and the target appliance 132 of the DR system 100 of FIG. 1.

With combined reference to FIGS. 1 and 2, the processor 224 may include an arithmetic logic unit (ALU), a microprocessor, a general-purpose controller, or some other processor array to perform computations and provide electronic display signals to the display 134. The processor 224 may be coupled to the bus 220 for communication with the other components via a signal line 248. The processor 224 generally processes data signals and may include various computing architectures including a complex instruction set computer (CISC) architecture, a reduced instruction set computer (RISC) architecture, or an architecture implementing a combination of instruction sets. Although FIG. 2 includes a single processor 224, multiple processors may be included in the computing device 200. Other processors, operating systems, sensors, displays, and physical configurations may be possible.

The memory 222 may be configured to store instructions and/or data that may be executed by the processor 224. The memory 222 may be coupled to the bus 220 for communication with the other components via a signal line 250. The instructions and/or data may include code for performing the techniques or methods described herein. The memory 222 may be a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 226 may be configured to transmit and receive data to and from at least one of the DR server 112, the C&I server 114, the device 104, or the target appliance 132 depending upon where the DR module 110 is stored. The communication unit 226 may be coupled to the bus 220 via a signal line 254. In some embodiments, the communication unit 226 includes a port for direct physical connection to the network 140 or to another communication channel. For example, the communication unit 226 may include a USB, SD, CAT-5, or similar port for wired communication with the components of the DR system 100. In some embodiments, the communication unit 226 includes a wireless transceiver for exchanging data via communication channels using one or more wireless communication methods, including IEEE 802.11, IEEE 802.16, BLUETOOTH®, global system for mobile (GSM), general packet radio service (GPRS), enhanced data rates for GSM evolution (EDGE), code division multiple access (CDMA), universal mobile telecommunications system (UMTS), LTE, LTE-A, or another suitable wireless communication method.

In some embodiments, the communication unit 226 includes a cellular communications transceiver for sending and receiving data over a cellular communications network including via SMS, MMS, hypertext transfer protocol (HTTP), direct data connection, WAP, e-mail, or another suitable type of electronic communication. In some embodiments, the communication unit 226 includes a wired port and a wireless transceiver. The communication unit 226 may also provide other conventional connections to the network 140 for distribution of files and/or media objects using standard network protocols including TCP/IP, HTTP, HTTPS, and SMTP, etc.

In some embodiments, for instance, in embodiments in which the computing device 200 is included in the device 104, the computing device 200 may include the display 134, the sensor 136, the input device 144, or some combination thereof discussed herein. The display 134, the sensor 136, or the input device 144, when included, may be coupled to the bus 220 via signal lines 252, 256, and 260, respectively. The display 134, the sensor 136, the input device 144, or some combination thereof may accordingly communicate with modules included in the DR module 110.

In the embodiment of FIG. 2, the DR module 110 may include a communication module 202, a display module 204, a generation module 208, a determination module 212, a verification module 216, an estimation module 218, and an assessment module 206 (collectively, modules of the DR module 110). Each of the modules of the DR module 110 may be implemented as software including one or more routines configured to perform one or more operations. The modules of the DR module 110 may include a set of instructions executable by the processor 224 to provide the functionality described below. In some instances, the modules of the DR module 110 may be stored in or at least temporarily loaded into the memory 222 of the computing device 200 and may be accessible and executable by the processor 224. One or more of the modules of the DR module 110 may be adapted for cooperation and communication with the processor 224, and components of the computing device 200 via the bus 220. The communication module 202 may be configured to handle communications between the DR module 110 and other components of the computing device 200 (e.g., 224, 222, 134, 136, 144, and 226). The communication module 202 may be configured to send and receive data, via the communication unit 226, to and from one or more of the device 104, the DR server 112, the target appliance 132, and the C&I server 114. In some instances, the communication module 202 may cooperate with the other modules (e.g., 204, 206, 208, 212, 216, and 218) to receive and/or forward, via the communication unit 226, data from the components of the DR system 100.

In some embodiments, the communication module 202 may receive a DR event notification from the DR server 112. The DR event notification may include DR event information pertaining to a DR event and curtailment information. The DR event information may include, but is not limited to, DR event identification information, time/date of the DR event, duration, etc. The curtailment information may include an amount of curtailment requested by the utility 138 and/or may include a specific resource curtailment related to the target appliance 132.

In response to receiving the DR event notification, the communication module 202 may communicate a notification acknowledgement to the DR server 112. For example, the communication module 202 may communicate the notification acknowledgement to the communication unit 226 via the bus 220. The communication unit 226 may then communicate the notification acknowledgment to the DR server 112 via the network 140. The notification acknowledgement may indicate reception of the DR event notification by the computing device 200. Additionally, the communication module 202 may forward the DR event notification to the display module 204.

The display module 204 may be configured to receive data and communicate the data to the display 134 for display thereon. The display module 204 may communicate with other components of the computing device 200 via the bus 220. In some embodiments, the display module 204 may receive the curtailment request pertaining to the DR event from the communication module 202. The display module 204 may then communicate the curtailment request to the display 134. The curtailment request may be based on the information pertaining to a DR event and/or curtailment information included in the DR event notification. For example, the curtailment request may include DR event information such as DR event identification information and/or an incentive for participation. Additionally, the curtailment request may include one or more icons or other user interface (UI) elements. The icons or other UI elements may enable the residential/SMB customer 102 to input a DR event participation confirmation (e.g., opt in) or a DR event participation refusal (e.g., opt out).

In some embodiments, in addition to or alternatively to the icons or other UI elements, the DR event participation confirmation may be automatically generated. For instance, the DR event participation confirmation may be based upon a predefined pattern or an agreement between the residential/SMB customer 102 and the utility 138. For example, the residential/SMB customer 102 may agree to participate if the residential/SMB customer 102 is located at a particular location or may automatically participate under certain conditions such as curtailment amount, weather patterns, or an appliance (e.g., the target appliance 132) involved in the DR event.

User input may be received by the computing device 200 via the input device 144 and/or the display 134. In the depicted embodiment, the residential/SMB customer 102 provides the user input. The user input may be communicated to the communication module 202. The user input may include the DR event participation confirmation or the DR event participation refusal. The communication module 202 may then communicate a participation signal representative of at least a portion of the user input to the DR server 112. In these and other embodiments, the DR server 112 may have received the notification acknowledgement and the participation signal. Accordingly, the DR server 112 and/or the utility 138 associated therewith may know a number of received DR event notifications and a number of participants. The utility 138 may thus determine participation rates, effectiveness of curtailment requests, reliability or historical participation of the residential/SMB customer 102, and the like.

The generation module 208 may be configured to generate an appliance list and feedback based on data gathered by the sensor 136. The generation module 208 may communicate with other components of the computing device 200 via the bus 220. In some embodiments, the generation module 208 may generate the appliance list and communicate the appliance list to the display module 204. The display module 204 may communicate the appliance list to the display 134. The appliance list may include one or more appliances having curtailment capabilities. Additionally, the appliance list may include icons or other UI elements that enable selection of a subset of the appliances. The subset of the appliances may include appliances that may be utilized in DR events. For example, in the depicted embodiment, the appliance list may be displayed to the residential/SMB customer 102, who may select the target appliance 132 from the appliance list using an icon or other UI element. A selection of the target appliance 132 may be received via the input device 144 and/or the display 134.

The generation and/or the display of the appliance list may occur prior to the receiving of the DR event notification. Additionally or alternatively, an appliance may be added between the reception of DR event notifications. For example, the residential/SMB customer 102 may purchase an appliance having curtailment capabilities. The residential/SMB customer 102 may add the appliance as a new target appliance.

In embodiments in which the target appliance 132 is selected, the curtailment request may include resource curtailment pertaining to the target appliance 132 and/or an incentive pertaining to curtailment of the target appliance 132 during the DR event. Additionally, in these and other embodiments, the user input may include a target appliance selection indicating curtailment during the DR event of a selected target appliance.

Moreover, in some embodiments in which the target appliance 132 is selected, the computing device 200 may implement the determination module 212 to determine a control command for the target appliance 132. The determination module 212 may be configured to determine control commands and/or current location. The determination module 212 may communicate with other components of the computing device 200 via the bus 220. The control command may be based on the DR event notification and/or a pre-configured setting related to the target appliance 132. For example, the memory 222 may include multiple pre-configured settings related to multiple appliances included in the appliance list. The target appliance 132, when selected, may trigger the determination module 212 to determine control commands related to the target appliance 132. In these and other embodiments, in response to the user input including the DR event participation confirmation, the control command may be communicated to the communication module 202. The communication module 202 may then transmit the control command to affect an operation of the target appliance 132.

For example, the curtailment request may include information pertaining to the target appliance 132. In response to the residential/SMB customer 102 selecting an icon indicating the residential/SMB customer 102 is participating in the DR event, which includes curtailment of the target appliance 132, the communication module 202 may transmit a command control that affects the operation of the target appliance 132 in accordance with the curtailment specified in the curtailment request.

In some embodiments, the determination module 212 may determine whether a current location is within a particular area. For example, in these and other embodiments, the sensor 136 may include a location sensor. The sensor 136 may communicate a current location to the determination module 212. The determination module 212 may then determine whether the current location is within the particular area. The particular area may include one or more areas such as a primary place of business, a residence, etc. The particular area may be stored in the memory 222 in some embodiments. The determination module 212 may communicate a signal indicating whether the current location is within the particular area to the communication module 202. In response to the current location being within the particular area, the communication module 202 may transmit a control command to affect an operation of the target appliance 132 via a first protocol and/or a first media. In response to the current location being outside the particular area, the communication module 202 may transmit the control command to affect the operation of the target appliance 132 via a second protocol and/or a second media. The first protocol may be different from the second protocol and/or the first media may be different from the second media.

In some embodiments, the generation module 208 may generate feedback based on data gathered by the sensor 136. For example, the sensor 136 may include a gyroscopic sensor, a thermal sensor, or another sensor configured to measure a condition of the computing device 200. The measurement may be communicated to the generation module 208. The generation module 208 may then generate feedback based on the measurement. The generation module 208 may then communicate the feedback to the communication module 202. The communication module 202 may then communicate the feedback to the DR server 112. An example of the feedback may include representation of a thermal measurement of an environment of the computing device 200. The thermal measurement may indicate that the residential/SMB customer 102 has lowered a thermostatic setting in accordance with a curtailment request of a DR event.

Additionally, in some embodiments, the display module 204 may display a notification limit inquiry. The notification limit inquiry may include one or more notification limits, which may limit communication between the DR server 112 and the computing device 200. Some examples of the notification limits may include a maximum number of DR event notifications in a particular time period (e.g., five DR event notifications a month), a maximum frequency of DR event notifications (e.g., one DR event notification every two days), a prioritization of DR event notifications (e.g., DR event notifications with an incentive over one dollar), and a device preference (e.g., DR event notifications related to dryer duty cycle only).

A selection of notification limits may be received via the input device 144 and/or the display 134. The selected notification limits may be communicated to the verification module 216. The verification module 216 may be configured to verify DR event notifications do not violate notification limits. The verification module 216 may communicate with other components of the computing device 200 via the bus 220. For example, in embodiments in which the notification limits are selected, prior to displaying the curtailment request, the verification module 216 may verify the DR event notification has not violated one or more of the notification limits.

Additionally, in some embodiments, the display module 204 may display an automated control decision inquiry. The automated control decision inquiry may include one or more circumstances during which the customer 102 may enable automated control decisions of the target appliance 132. The automated control decision may enable automated control of the target appliance 132 during DR events in which the circumstances exist. The circumstances may then be selected for the target appliance 132. A selection of the circumstances may be received via the input device 144 and/or the display 134. The selected circumstances may be communicated to the determination module 218.

In these and other embodiments, the communication module 202 may receive the DR event notification. The communication module 202 may communicate information pertaining to the DR event to the determination module 212. The determination module 212 may determine whether the circumstances are present during which the customer 102 has enabled automated control of the target appliance 132. The determination module 212 may communicate a signal to the generation module 208 indicating whether the circumstances are present. The generation module 208 may generate a control command, which may be communicated to the target appliance 132 via the communication module 202 and the network 140.

One or more of the above functions of the modules of the DR module 110 may vary based on the particular computing device 200. For example, some of the above functions of the modules of the DR module 110 may be consistent with implementations in which the computing device 200 includes the device 104 and/or the target appliance 132. For example, the computing device 200 may include a mobile phone. Accordingly, the DR module 110 may be included as an application or app that is run on the mobile phone and that performs one or more functions as described herein.

Some alternative functions of one or more of the modules of the DR module 110 are described below. The alternative functions may be consistent with implementations in which the computing device 200 includes the DR server 112 or another similar system configured to communicate with the device 104, the target appliance 132, the C&I server 114, or some combination thereof.

For example, in some embodiments, the communication module 202 may communicate the DR event notification to the device 104 and/or the C&I server 114, receive the notification acknowledgement from the device 104 and/or the C&I server 114, and receive the participation signal from the device 104 and/or the C&I server 114. Additionally or alternatively, in these and other embodiments, the generation module 208 may generate incentives for DR event participation and/or target appliance curtailment. The generation module 208 may communicate the incentives to the communication module 202. The communication module 202 may then include the generated incentives in the DR event notification.

The communication module 202 may communicate the notification acknowledgement and/or the participation signal to the estimation module 218. The estimation module 218 may be configured to estimate resource curtailment. The estimation module 218 may communicate with other components of the computing device 200 via the bus 220. For example, the estimation module may receive the notification acknowledgement and/or the participation signal. Based at least partially on the participation signal and the notification acknowledgement, the estimation module 218 may estimate resource curtailment for a DR event. The estimation may include a number of participants, an amount of resource curtailment committed to, and the like.

Additionally, as discussed above, the determination module 212 may determine whether a current location is within a particular area. The current location may be related to the device 104, for instance. A signal indicating whether (or not) the device 104 is within the particular area may be communicated to the communication module 202. In response to the current location of the device 104 being within the particular area, the communication module 202 may communicate the DR event notification to the device 104. In response to the current location of the device 104 being outside the particular area, the communication module 202 may not communicate the DR event notification to the device 104.

The communication module 202 may also receive feedback from the device 104 and/or the C&I server 114. As discussed above, the feedback may be based on data gathered by the sensor 136 in some embodiments. The communication module 202 may communicate the feedback to the assessment module 206 and/or the estimation module 218.

The assessment module 206 may be configured to assess feedback. The assessment module 206 may communicate with other components of the computing device 200 via the bus 220. In some embodiments, based on the feedback, the assessment module 206 may assess participation of the residential/SMB customer 102 or more generally, a user associated with the device 104.

The estimation module 218 may receive the feedback. The estimation module 218 may estimate curtailment amount based on the feedback. For example, the feedback may include signals representative of the measurements performed by the sensor 136. The estimation module 218 may conclude from the measurements whether and to what degree a customer 102 is participating. The estimation module 218 may accordingly estimate the curtailment amount based on the feedback.

FIGS. 3A-3F illustrate some example screenshots 300A-300F (generally, screenshot 300 or screenshots 300) of information that may be displayed on the device 104 discussed with reference to FIGS. 1 and 2. In FIGS. 3A-3F, the device 104 includes a mobile device such as a smartphone or tablet personal computer. Additionally, in FIGS. 3A-3F, the device 104 includes a touch screen display that may be configured to receive user input by a user touching the display. In alternative embodiments, the device 104 may include another device type, may include a different type of display, may include an input (e.g., the input device 144), or any combination thereof.

With combined reference to FIGS. 3A-3F, the screenshots 300 may include one or more tabs 302A-302C. Selection of one of the tabs 302A-302C may change which information is displayed by the device 104. When selected, an event tab 302A may be configured to display information pertaining to a pending DR event. For example, when the event tab 302A is selected, a curtailment request of the pending DR event is displayed. When selected, a history tab 302B may be configured to display information pertaining to one or more past DR events. When selected, a settings tab 302C may be configured to display one or more settings related to DR events, appliances, or communication protocols. In some alternative embodiments, additional or fewer tabs may be included. Additionally, in some alternative embodiments, tabs having other names may be configured to display other information.

FIG. 3A depicts a first screenshot 300A. The first screenshot 300A includes a first curtailment request 308A. The first curtailment request 308A includes DR event information. Specifically, in the depicted embodiment, the DR event information of the first curtailment request 308A includes a DR event identifier (in FIG. 3A "Event ID"), a network identifier (in FIG. 3A "VTN ID"), a resource identifier (in FIG. 3A "Resource ID"), and a target curtailment (in FIG. 3A "Target"). Additionally, the first screenshot 300A may also include an opt in icon 310 and an opt out icon 312. Selection of the opt in icon 310 may result in or indicate a DR event participation confirmation. Selection of the opt out icon 312 may result in or indicate a DR event participation refusal. The opt in icon 310 and/or the opt out icon 312 may include incentives. The incentives may indicate a monetary amount exchanged for participation in a DR event, for instance. While icons are discussed here and elsewhere for simplicity in the discussion, buttons or other UI elements may be used instead of or in addition thereto.

FIG. 3B depicts a second screenshot 300B. The second screenshot 300B includes a second curtailment request 308B. The second curtailment request 308B includes a simple curtailment request ("New Event: Would You Like To Participate?"). Additionally, the second screenshot 300B may also include the opt in icon 310 and the opt out icon 312 as discussed with reference to FIG. 3A.

FIG. 3C depicts a third screenshot 300C. The third screenshot 300C includes a third curtailment request 308C. The third curtailment request 308C includes a curtailment request pertaining to specific target appliances, including "AC," "TV," "Washing Machine," "Fan," "Refrigerator," and "Oven" in FIG. 3C. The third curtailment request 308C includes a curtailment request ("New Event: Which Appliances Will You Turn Off?"). Additionally, the third screenshot 300C may also include a set of opt in icons 328. Each of the set of opt in icons 328 lists a target device. Selection of an icon in the set of opt in icons 328 may result in or indicate a participation confirmation with respect to the target appliance included in the icon. Additionally, each of the set of opt in icons 328 may include an incentive. The incentive may indicate a monetary amount, which may be exchanged for curtailment of the target appliance, for instance.

In FIGS. 3A-3C, the event tab 302A may be selected. Additionally, the first, second, and third screenshots 300A-300C may include a refresh icon 314 and a view other events icon 316. When selected, the refresh icon 314 may be configured to update the first, the second, or the third screenshots 300A-300C. When selected, the view other events icon 316 may be configured to display information pertaining to other DR events.

FIG. 3D depicts a fourth screenshot 300D. The fourth screenshot 300D includes a list of past DR events 318. The list of past DR events 318 may be displayed in response to selection of the history tab 302B. A user associated with the device 104 may accordingly view information pertaining to the DR events included in the list of past DR events 318.

FIG. 3E depicts a fifth screenshot 300E. The fifth screenshot 300E includes an appliance list 320. The appliance list 320 may include appliances that include curtailment capabilities, including "AC," "TV," "Washing Machine," "Fan," "Refrigerator," and "Oven" in FIG. 3E. Selection of an icon 324 corresponding to each of the appliances may designate the appliance as a target appliance. With combined reference to FIGS. 3C and 3E, the "Fan" and the "Oven" may be indicated as "OFF" in the fifth screenshot 300E and third screenshot 300C. This may indicate that the "Oven" and the "Fan" have not been selected as target appliances. Referring back to FIG. 3E, the fifth screenshot 300E may include an add appliances icon 322. Selection of the add appliances icon 322 may trigger a new or updated appliance list including additional appliances or a manual entry screen in which a new appliance may be added to the appliance list or as a target appliance.

FIG. 3F depicts a sixth screenshot 300F. The sixth screenshot 300F includes a network connection configuration screen (network screen) 326. The network screen 326 may enable selection or specification of one or more network communication links between the device 104 and other systems such as the DR server 112 and the target appliance 132 of FIG. 1. Referring to FIGS. 3E and 3F, the fifth screenshot 300E and the sixth screenshot 300F may be viewed by respectively selecting a Target Appliances icon (not shown) or a Network Settings icon (not shown) from within the settings tab 302C.

Figure 4:
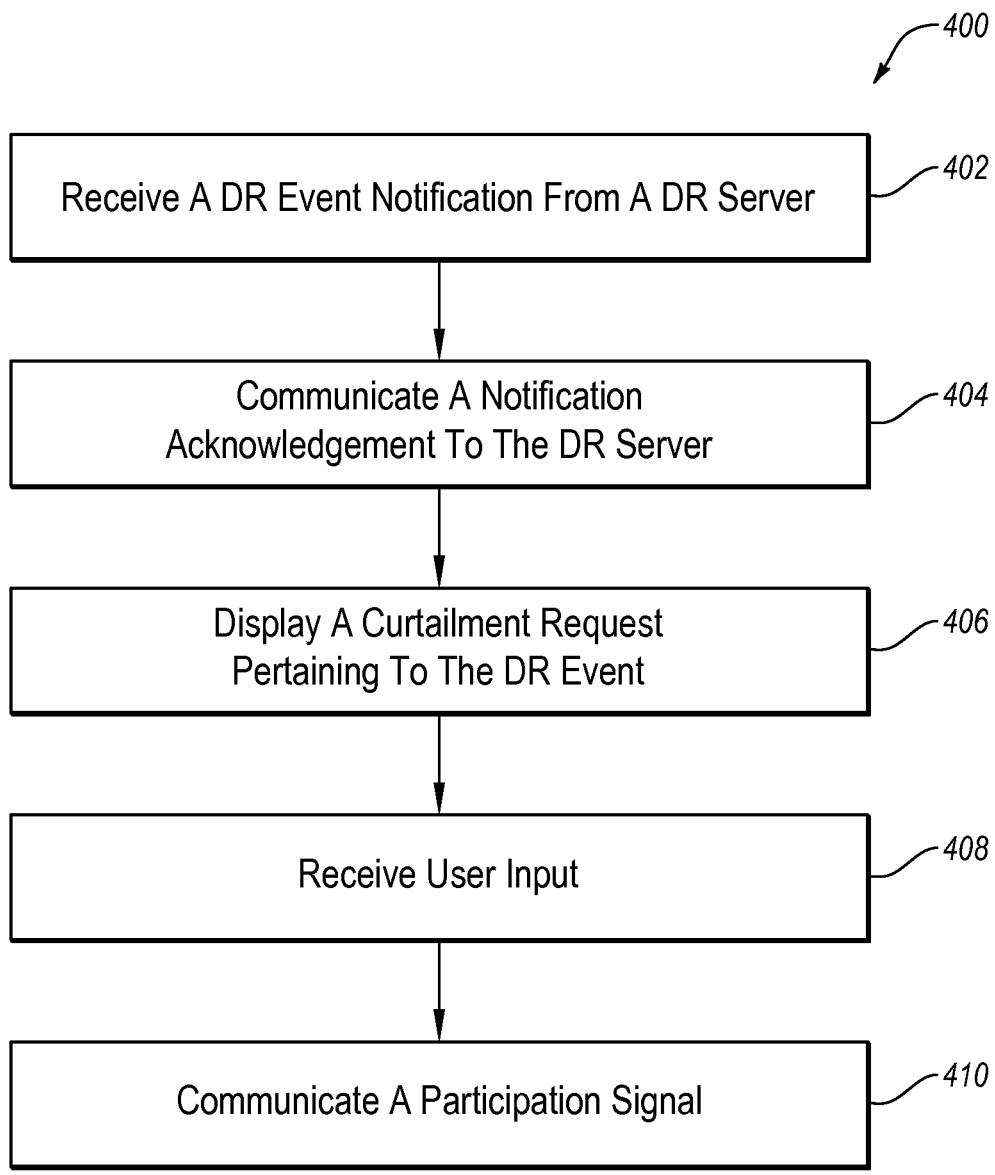
FIG. 4 is a flow diagram of an example method of residential or small and medium business (SMB) DR coordination.

FIG. 4 is a flow diagram of an example method 400 of residential or SMB DR coordination, arranged in accordance with at least one embodiment described herein. The method 400 may be performed in a DR system such as the DR system 100 of FIG. 2 in which the utility 138 supplies electricity to sites associated with the residential/SMB customer 102. Similar methods may be implemented in DR systems in which the utility 138 supplies another resource to the sites.

The method 400 may be programmably performed in some embodiments by the computing device 200 described with reference to FIGS. 1 and 2. Additionally or alternatively, the method 400 may be programmably performed by the device 104. One or more of the device 104 and the computing device 200 may include or may be communicatively coupled to a non-transitory computer-readable medium (e.g., the memory 106 of FIG. 1 or 222 of FIG. 2) having stored thereon or encoded therein programming code or instructions that are executable by a processor to perform or cause performance of the method 400. Additionally or alternatively, one or more of the device 104 and the computing device 200 may include a processor (e.g., the processor 108 of FIG. 1 or 224 of FIG. 2) that is configured to execute computer instructions to cause or control performance of the method 400. Although illustrated as discrete blocks, various blocks may be divided into additional blocks, combined into fewer blocks, or eliminated, depending on the desired implementation.

At block 402, a DR event notification may be received from a DR server. The DR event notification may include DR event information pertaining to a DR event and curtailment information. At block 404, a notification acknowledgement may be communicated to the DR server. The notification acknowledgement may indicate reception of the DR event notification. At block 406, a curtailment request pertaining to the DR event may be displayed. The curtailment request may be based on the curtailment information included in the DR event notification and some portion of the DR event information.

At block 408, user input may be received. The user input may include a DR event participation confirmation or a DR event participation refusal. At block 410, a participation signal may be communicated. In some embodiments, the participation signal may be communicated to the DR server. The participation signal may be representative of at least a portion of the user input.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

For example, in some embodiments, a notification limit inquiry may be displayed. A selection of notification limits may be received. The notification limits may include, but are not limited to, a maximum number of DR event notifications, a maximum frequency of DR event notifications, a prioritization of DR event notifications, and a device preference. In these and other embodiments, prior to the displaying the curtailment request, it may be verified that the DR event notification has not violated one or more of the notification limits.

Additionally or alternatively, in some embodiments of the method 400, an appliance list may be generated. The appliance list may include appliances having energy curtailment capabilities. The appliance list may be displayed. A selection of a target appliance included in the appliance list may be received. In these and other embodiments, the curtailment request may include energy curtailment pertaining to the target appliance and/or an incentive pertaining to curtailment of the target appliance during the DR event. Additionally, the user input may include a target appliance selection indicating curtailment during the DR event of a selected target appliance.

Additionally or alternatively, in some embodiments of the method 400, a control command may be determined for a target appliance. The control command may be based on the DR event notification and/or a pre-configured setting related to the target appliance. In these and other embodiments, in response to the user input including the DR event participation confirmation, the control command may be transmitted to affect an operation of the target appliance.

Additionally or alternatively, in some embodiments of the method 400, it may be determined whether a current location is within a particular area. In response to the current location being within the particular area, a control command may be transmitted to affect an operation of a target appliance via one or more of a first protocol and a first media. In response to the current location being outside the particular area, the control command may be transmitted to affect the operation of the target appliance via one or more of a second protocol and a second media. Additionally or alternatively, in some embodiments of the method 400, feedback may be generated based on data gathered by a sensor. The feedback may be communicated to the DR server.

Additionally or alternatively, in some embodiments of the method 500, a selection of circumstances that trigger automated control of a target appliance may be received. In these and other embodiments, in response to the circumstance being present, a control command may be generated and communicated to the target appliance.

Figure 5:
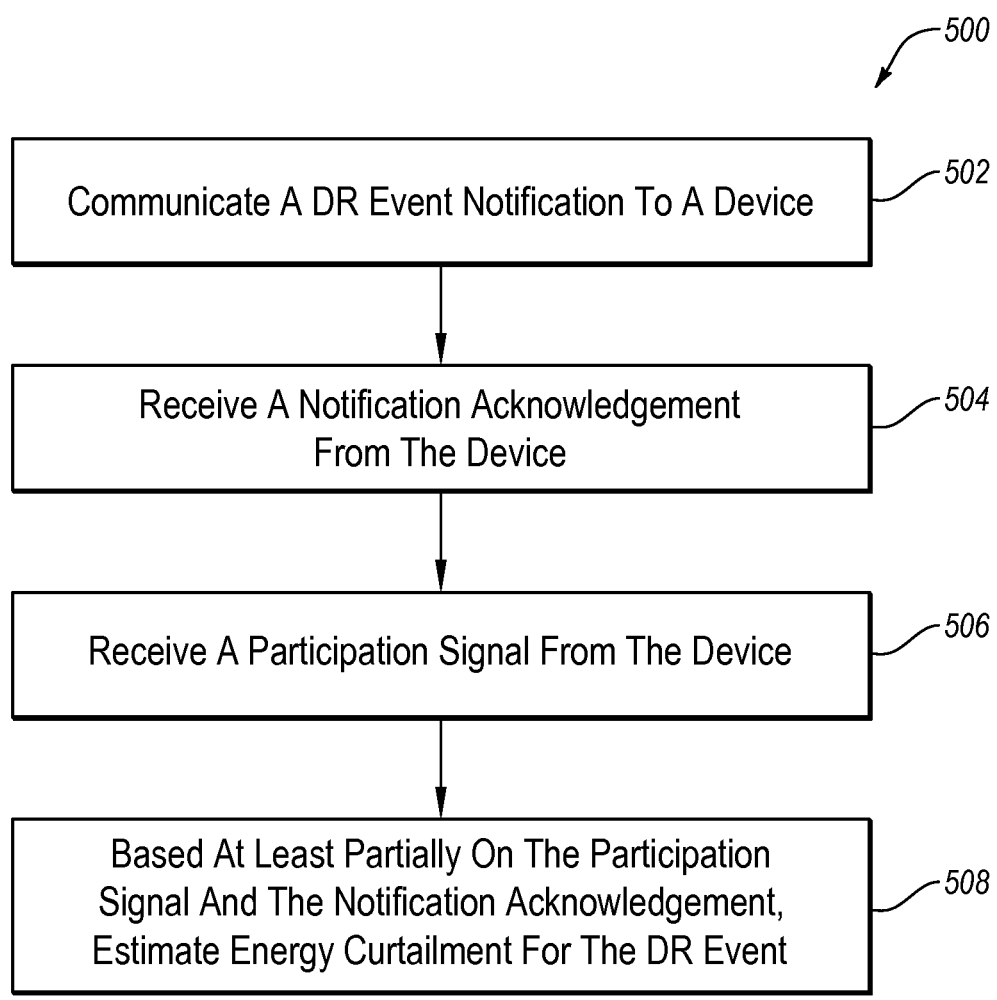
FIG. 5 is a flow diagram of another example method of residential or SMB DR coordination, arranged in accordance with at least one embodiment described herein.

FIG. 5 is a flow diagram of an example method 500 of residential or SMB DR coordination arranged in accordance with at least one embodiment described herein. The method 500 may be performed in a DR system such as the DR system 100 of FIG. 2 in which the utility 138 supplies electricity to sites associated with the residential/SMB customer 102. Similar methods may be implemented in DR systems in which the utility 138 supplies another resource to the sites.

The method 500 may be programmably performed in some embodiments by the computing device 200 described with reference to FIGS. 1 and 2. Additionally or alternatively, the method 500 may be programmably performed by the DR server 112. One or more of the DR server 112 and the computing device 200 may include or may be communicatively coupled to a non-transitory computer-readable medium (e.g., the memory 106 of FIG. 1 or 222 of FIG. 2) having stored or encoded therein programming code or instructions that are executable by a processor to perform or cause performance of the method 500. Additionally or alternatively, one or more of the DR server 112 and the computing device 200 may include a processor (e.g., the processor 108 of FIG. 1 or 224 of FIG. 2) that is configured to execute computer instructions to cause or control performance of the method 500. Although illustrated as discrete blocks, various blocks may be divided into additional blocks, combined into fewer blocks, or eliminated, depending on the desired implementation.

At block 502, a DR event notification may be communicated to a device. The DR event notification may include DR event information pertaining to a DR event and curtailment information. At block 504, a notification acknowledgement may be received from the device. The notification acknowledgement may indicate reception of the DR event notification. At block 506, a participation signal may be received from the device. The participation signal may be representative of at least a portion of user input, which may include a DR event participation confirmation or a DR event participation refusal. At block 508, based at least partially on the participation signal and the notification acknowledgement, energy curtailment may be estimated for the DR event.

Additionally or alternatively, in some embodiments of the method 500, it may be determined whether a current location of the device is within a particular area. In response to the current location of the device being within the particular area, the DR event notification may be communicated to the device. In response to the current location of the device being outside the particular area, the DR event notification may not be communicated to the device.

Additionally or alternatively, in some embodiments of the method 500, feedback may be received from the device. The feedback may be based on data gathered by a sensor. Based on the feedback, a participation of a user associated with the device may be assessed and/or a curtailment amount may be estimated based on the feedback Additionally or alternatively, in some embodiments of the method 500, incentives for DR event participation and target appliance curtailment may be generated. The DR event notification may include the generated incentives.

Additionally or alternatively, in some embodiments of the method 500, a second DR event notification may be communicated to a C&I server. The second DR event notification may include the DR event information pertaining to the DR event and curtailment information relevant to a C&I customer.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein may be implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of residential or small and medium (SMB) business demand response (DR) coordination, a method comprising:
   prior to a DR event:
      determining, by a DR server, whether incentives for the DR event are greater than particular thresholds that trigger automated control of appliances; and
      determining, by the DR server, whether a current location of a mobile device associated with a residential/SMB customer is within a particular area based on input of a location sensor of the mobile device;
   in response to the current location of the mobile device being within the particular area and the incentives are greater than the particular thresholds:
      verifying, by the DR server, that a DR event notification does not violate a DR event notification limit that includes one or both of a maximum number of DR event notifications and a maximum frequency of DR event notifications;
      in response to the DR event notification not violating the DR event notification limit, communicating, by the DR server, the DR event notification to the mobile device, the DR event notification including DR event information pertaining to the DR event, curtailment information and the incentives related to each of the appliances associated with the residential/SMB customer that are configured to operate in a reduced consumption state in response to a control command;
      receiving, at the DR server, a notification acknowledgement from the mobile device, the notification acknowledgement indicating reception of the DR event notification by the mobile device;
      receiving, at the DR server, a participation signal from the mobile device, the participation signal being representative of at least a portion of user input, the user input including a DR event participation confirmation which indicates that the residential/SMB customer agrees to participate in the DR event and a selection of a target appliance from the appliances included in the DR event notification;
      receiving, at the DR server, feedback from the device, the feedback being based on data measured by a sensor included in the mobile device that is indicative of controlled operation of the target appliance in the reduced consumption state during the DR event;
      based at least partially on the participation signal, the feedback, and the notification acknowledgement, estimating, at the DR server, energy curtailment for the DR event, wherein a portion of the energy curtailment is operation of the target appliance at the reduced consumption state; and
      assessing, at the DR server, a participation of the residential/SMB customer based on the feedback.

2. The method of claim 1, further comprising in response to the current location of the device being outside the particular area or in response to the DR event notification violating the DR event notification limit, not communicating the DR event notification to the device.

3. The method of claim 1, further comprising communicating a second DR event notification to a commercial and industrial (C&I) customer, the second DR event notification including the DR event information pertaining to the DR event and curtailment information relevant to the C&I customer.

4. A method of residential or small and medium business (SMB) demand response (DR) event implementation, the method comprising:

receiving, at a mobile device associated with a residential/SMB customer, a DR event notification from a DR server, the DR event notification including DR event information pertaining to a DR event, curtailment information that includes incentives for the DR event that are greater than particular thresholds that trigger automated control of appliances, and a target appliance of the appliances involved in the DR event;

communicating, by the mobile device, a notification acknowledgement to the DR server, the notification acknowledgement indicating reception of the DR event notification;

verifying, by the mobile device, that the DR event notification does not violate a DR event notification limit that includes one or both of a maximum number of DR event notifications and a maximum frequency of DR event notifications;

in response to the DR event notification not violating the DR event notification limit:
  generating, by the mobile device, an appliance list including the appliances having energy curtailment capabilities that are associated with the residential/SMB customer; and
  displaying, on a display of the mobile device, the appliance list and a curtailment request pertaining to the DR event, the curtailment request including the incentives pertaining to curtailment of each of the appliances in the appliance list during the DR event, and the curtailment request being based on the curtailment information included in the DR event notification and including some portion of the DR event information;

receiving, on an input device of the mobile device, a selection of a target appliance included in the appliance list;

receiving, on the input device of the mobile device, a user input including a DR event participation confirmation;

communicating, by the mobile device to the DR server via a network, a participation signal that is representative of at least a portion of the user input;

determining, by the mobile device, a control command for the target appliance based on the DR event notification and a pre-configured setting related to the target appliance, wherein the control command is configured for transmission via a network that supports electronic data communication between the mobile device, the target appliance, and the DR server using one or more media that include a first media and a second media that is different from the first media and the control command is configured to be formatted according to one or more data communication protocols that include a first protocol and a second protocol that is different from the first protocol;

determining based on input of a location sensor of the mobile device, whether a current location of the mobile device is within a particular area;

in response to the current location being within the particular area, placing the target appliance in a reduced consumption state through transmission of the control command via the first media, the control command being formatted according to the first protocol; and in response to the current location being outside the particular area, placing the target appliance in a reduced consumption state through transmission of the control command via the first media, the control command being formatted according to the second protocol.

5. The method of claim 4, wherein
the curtailment request includes energy curtailment pertaining to the target appliance.

6. The method of claim 4, further comprising:
receiving a selection of circumstances that trigger automated control of the target appliance; and
in response to the circumstances being present in the DR event notification, transmitting a control command to the target appliance without user input.

7. The method of claim 4, further comprising:
generating feedback based on data gathered by a sensor; and
communicating the feedback to the DR server.

8. The method of claim 4, wherein:
the first protocol is the smart energy profile (SEP) protocol;
the first media is a Wi-Fi media;
the second protocol is the Echonet Lite; and
the second media is a cellular media.

9. The method of claim 4, wherein the particular area includes a residence of a residential SMB customer.

10. The method of claim 9, wherein:
the first protocol includes a standard-based protocol;
the second media may include a wireless gateway; and
the second protocol includes network address translation (NAT) or universal plug and play (UPnP)).

11. A non-transitory computer-readable medium having encoded therein programming code executable by one or more processors to perform or control performance of operations comprising:

receiving, at a mobile device associated with a residential/SMB customer, a DR event notification from a DR server, the DR event notification including DR event information pertaining to a DR event, curtailment information that includes incentives for the DR event that are greater than particular thresholds that trigger automated control of appliances, and a target appliance of the appliances involved in the DR event;

communicating, by the mobile device, a notification acknowledgement to the DR server, the notification acknowledgement indicating reception of the DR event notification;

verifying, by the mobile device, that the DR event notification does not violate a DR event notification limit that includes one or both of a maximum number of DR event notifications and a maximum frequency of DR event notifications;

in response to the DR event notification not violating the DR event notification limit:
  generating, by the mobile device, an appliance list including the appliances having energy curtailment capabilities that are associated with the residential/SMB customer; and
  displaying, on a display of the mobile device, the appliance list and a curtailment request pertaining to the DR event, the curtailment request including the incentives pertaining to curtailment of each of the appliances in the appliance list during the DR event, and the curtailment request being based on the curtailment information included in the DR event notification and including some portion of the DR event information;

receiving, on an input device of the mobile device, a selection of a target appliance included in the appliance list;

receiving, on the input device of the mobile device, a user input including a DR event participation confirmation;

communicating, by the mobile device to the DR server via a network, a participation signal that is representative of at least a portion of the user input;

determining, by the mobile device, a control command for the target appliance based on the DR event notification and a pre-configured setting related to the target appliance, wherein the control command is configured for transmission via a network that supports electronic data communication between the mobile device, the target appliance, and the DR server using one or more media that include a first media and a second media that is different from the first media and the control command is configured to be formatted according to one or more data communication protocols that include a first protocol and a second protocol that is different from the first protocol;

determining based on input of a location sensor of the mobile device, whether a current location of the mobile device is within a particular area;

in response to the current location being within the particular area, placing the target appliance in a reduced consumption state through transmission of the control command via the first media, the control command being formatted according to the first protocol; and in response to the current location being outside the particular area, placing the target appliance in a reduced consumption state through transmission of the control command via the first media, the control command being formatted according to the second protocol.

12. The non-transitory computer-readable medium of claim 11, wherein the curtailment request includes energy curtailment pertaining to the target appliance.

13. The non-transitory computer-readable medium of claim 11, wherein the operations further comprise:
generating feedback based on data gathered by a sensor; and
communicating the feedback to the DR server.

14. The non-transitory computer-readable medium of claim 11, wherein the operations further comprise:
receiving a selection of circumstances that trigger automated control of the target appliance; and
in response to the circumstances being present in the DR event notification, transmitting a control command to the target appliance without user input.

* * * * *